United States Patent [19]
Radakovich

[11] 3,771,438
[45] Nov. 13, 1973

[54] MEANS FOR MOLDING
[76] Inventor: Louis Radakovich, 13324 Green Dr., Chesterland, Ohio 44026
[22] Filed: Oct. 12, 1971
[21] Appl. No.: 188,236

[52] U.S. Cl................. 100/178, 100/193, 100/223, 100/257, 100/269 A
[51] Int. Cl............................................ B30b 5/00
[58] Field of Search...................... 100/257, 51, 99, 100/144, 177, 178, 193, 208, 269 A, 223, 221, 237

[56] References Cited
UNITED STATES PATENTS

| | | |
|---|---|---|
| 1,765,829 | 6/1930 | Fox et al......................... 100/178 X |
| 2,363,779 | 11/1944 | Duffy et al...................... 100/269 A |
| 3,125,842 | 3/1964 | Ferguson ....................... 100/223 X |
| 606,478 | 6/1898 | Tremaine et al............ 100/223 XR |
| 2,717,421 | 9/1955 | Beeson................... 100/269A XR |
| 2,822,030 | 2/1958 | Pokras........................ 100/51 XR |

Primary Examiner—Billy J. Wilhite
Attorney—Frank B. Robb

[57] ABSTRACT

The disclosure herein is of a means of molding, primarily directed to the art of urethane or similar plastic molding wherein pressures are relatively low and the time and pressure cycle is relatively short, involving the provision of a conveyor upon which press members are supported in which the molds are in turn positioned, the presses being connected to a central source of air pressure which is maintained during the molding cycle, making possible the continuation of the connection during such cycle whereby pressure may be maintained therein, the presses moving from a loading to an unloading position and returning within a minimum area, the presses in turn being of simple, compact construction whereby to reduce the total cost of the mechanism, with added efficiency and control being provided.

8 Claims, 9 Drawing Figures

PATENTED NOV 13 1973 3,771,438

L. RADAKOVICH
INVENTOR
BY Robb+Robb
Frank B Robb
ATTORNEYS

MEANS FOR MOLDING

OBJECTS OF THE INVENTION

It is a principal object of this invention to provide means for molding which involves the provision of a series of press units, which may be mounted on an endless conveyor whereby positioning of molds therewithin may be effected from one position and unloaded from another, with return of the press to its original loading position.

A further object of the invention is to provide a press of construction which facilitates the use of a large number of press units, since the construction is relatively simple and considerably less expensive than most presses heretofore used, the ability to transport the same with relatively inexpensive construction of conveyor being essentially a consideration.

Another object of the invention is to provide a means for supplying air or fluid under pressure to the respective press units, so as to maintain such fluid pressure during the molding cycle, and facilitate the maintenance of pressure for a predetermined time with automatic termination of pressure at the end thereof.

Another object of the invention is to provide an approach to urethane molding or the like, wherein the time and pressure cycle may be entered into and automatically terminated at predetermined or preset times, with the press in which the mold is positioned being movable to and from the loading station whereby to minimize labor involved in effecting the molding operation.

Other and similar objects of the invention will be understood from a consideration of the specification appended hereto, and disclosed in the drawings wherein.

DESCRIPTION OF THE INVENTION

Figure 1:
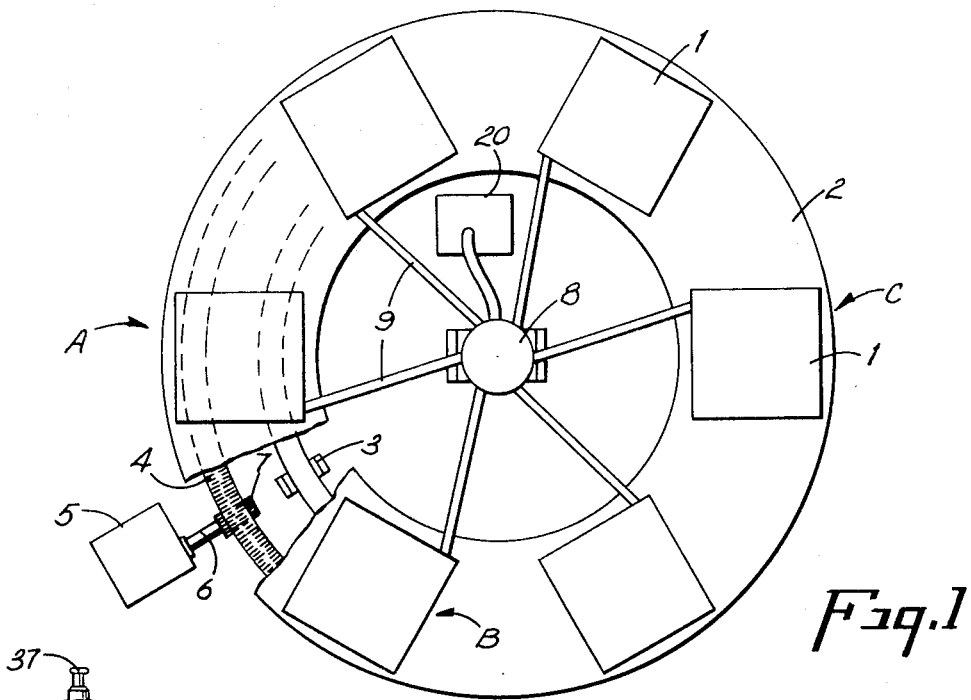
FIG. 1 is a plan view, somewhat diagrammatic in nature and partly fragmentary, to illustrate generally the method involved of moving press units from loading station to unloading station and returning the same by endless conveyor.

Referring now to FIG. 1 initially, this invention involves the provision of a series of press units designated 1, which are mounted on what may be termed an endless planar conveyor unit 2, being in this case a round table-like device, including therebeneath by way of example, suitable support rollers 3 and a drive ring 4 extending therearound.

The conveyor 2, as will be understood, provides a flat surface for support of the press unit 1 and is intended to be rotated upon the center by a drive mechanism 5 suggested as including a suitable drive shaft 6 driving a gear 7 engaged with the mating ring gear 4 previously mentioned.

Positioned about centrally of the mechanism, is what may be generally denoted as an air column 8 from which extend suitable air hoses or fluid pressure hoses 9, to each of the press units 1.

Figure 5:
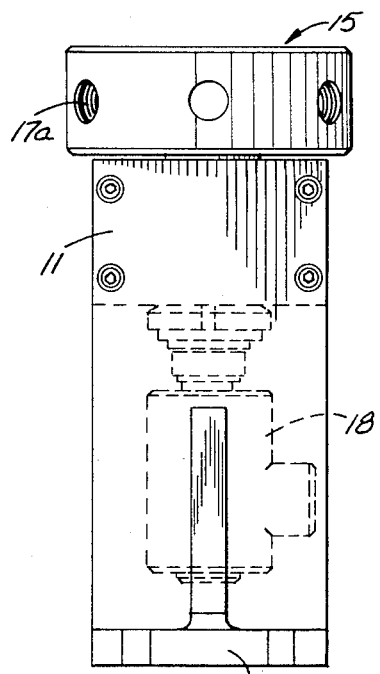
FIG. 5 is a side view of an air column unit for supplying air to a series of presses.
Figure 6:
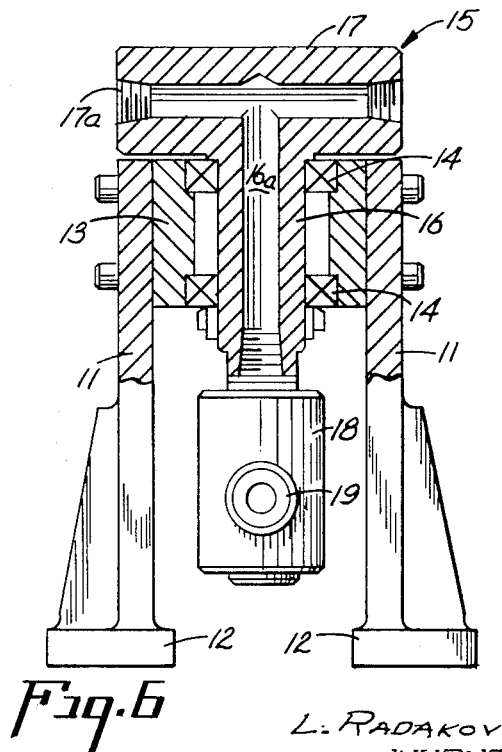
FIG. 6 is a view similar to FIG. 5, at right angles thereto and partly in section, illustrating in further detail the construction of the air column of FIG. 5.
Figure 7:
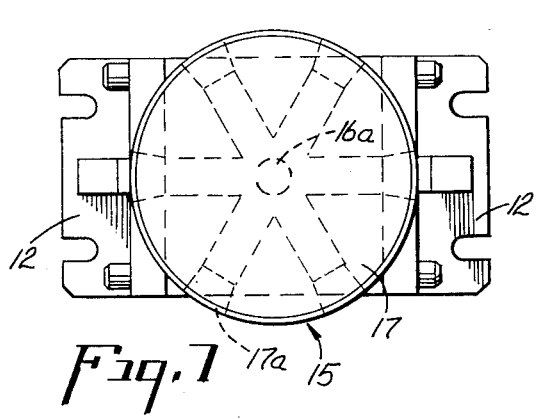
FIG. 7 is a top view of the air column of FIG. 5.
Figure 8:
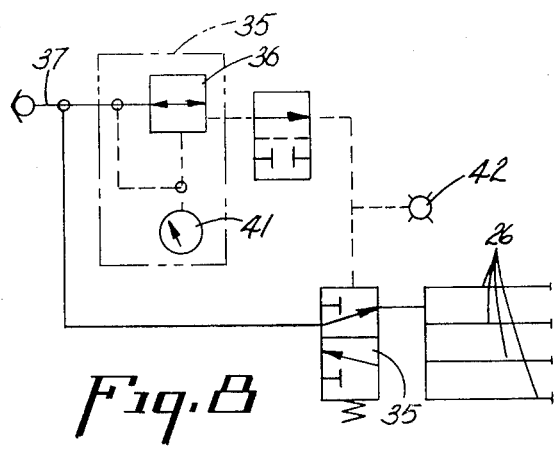
FIG. 8 is a diagrammatic view, showing the flow system for the fluid pressure.

The air column 8 is intended to supply air or fluid under pressure to the press units 1 as they rotate on the conveyor 2, the construction of the column being illustrated and described in relation to FIGS. 5, 6 and 7 as comprising generally a pair of support legs 11 with mounting members 12 at their lower ends, and being equipped at the upper ends with a bearing support member 13 in which a pair of ball bearings 14 are positioned.

The inner races of the ball bearings 14 in turn support a spindle 15 having a central cylindrical section 16 and an upper head member 17.

At the lower end of the spindle member 16 is a rotating union 18 which is connected as by the inlet 19 to a suitable source of air pressure suggested at 20 in FIG. 1.

The air pressure will be supplied by an air compressor as will be readily understood, which will preferably supply adequate quantities of air at pressures of about 120 pounds per square inch.

The rotating union 18 is connected to the interior passage 16a of the spindle 15, the passage 16a in turn being connected with a series of radial passages 17a which radial passages 17a are in turn connected to the fluid pressure hoses 9 as indicated in FIG. 1, the construction just described being arranged so that fluid under pressure can be continuously supplied to the various press units 1 as they rotate on the endless conveyor 2.

The construction of the press units hereof, denoted 1 and previously mentioned, will next be described and reference is made at this point to FIG. 2, which shows in plan the general unit, as involving a substantially rectangular device in general, and as suggested in FIGS. 3 and 4, includes upper and lower press plates 21 and 22 respectively, which in this instance are fabricated from a series of channel parts 22a alternately fixed to rectangular tubes 23 as by welding the same so that along each side a rectangular tube 23 is thereby positioned.

As will be observed, the upper and lower plates are identical in basic construction, and positioned with respect to one another by press shafts 24 which are essentially arranged to provide for adjustment of the upper press plate 21 with respect to the lower press plate 22 by means of nuts such as 25 manipulated in a manner which will be obvious to those skilled in the art.

Figure 4:
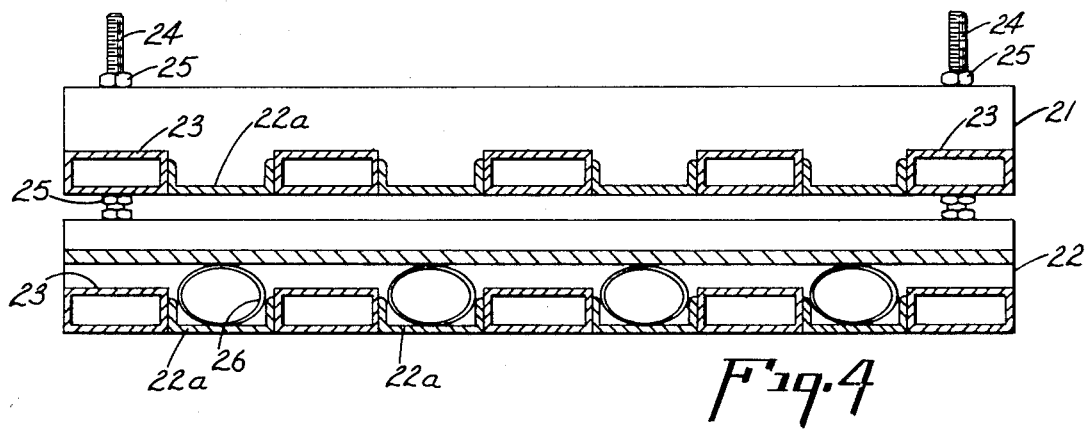
FIG. 4 is a sectional view, taken about on the line 4—4 of FIG. 3, looking in the direction of the arrows.
Figure 9:
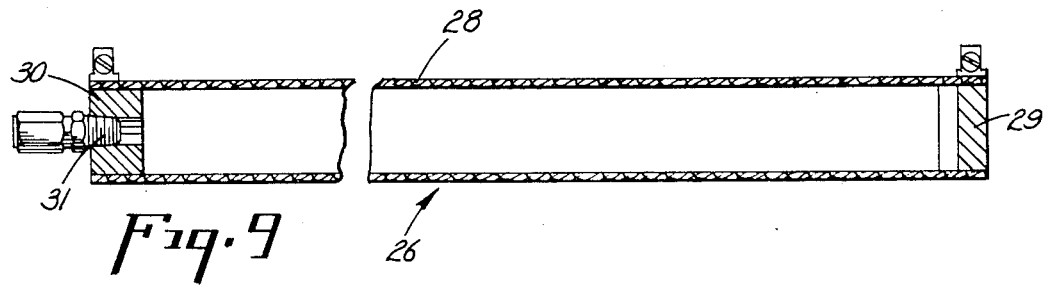
FIG. 9 is a side view, partly in section, showing one of the flexible pressure members incorporated in the press of FIG. 2.

Referring to FIG. 4, it will be seen that a series of flexible pressure members generally designated 26 are positioned in the channels 22a of the lower press plate 22 these pressure members being further illustrated in FIG. 9 as each comprising a flexible longitudinal section 28, sealed at one end by a suitable closure 29 and at the other by similar closure 30, in this case provided with an air inlet connection 31.

The flexible pressure members 26 are arranged to actuate a platen 32 positioned thereabove and beneath the lower surface provided by the upper press plate 21 formed by the smooth faces of the rectangular tubes 23 and channels 22a.

Figure 2:
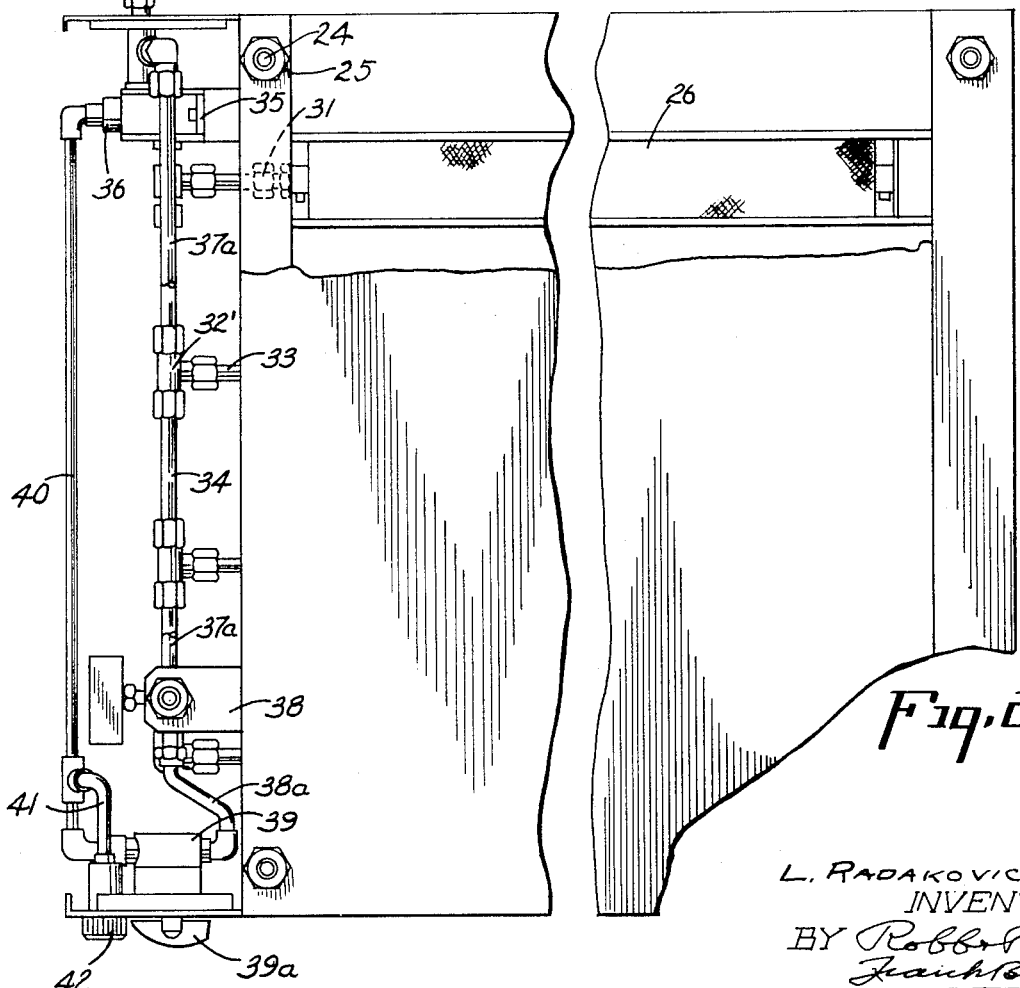
FIG. 2 is a plan view, partly in section and likewise fragmentary in some aspects, illustrating one of the press units availed of in carrying out the invention.
Figure 3:
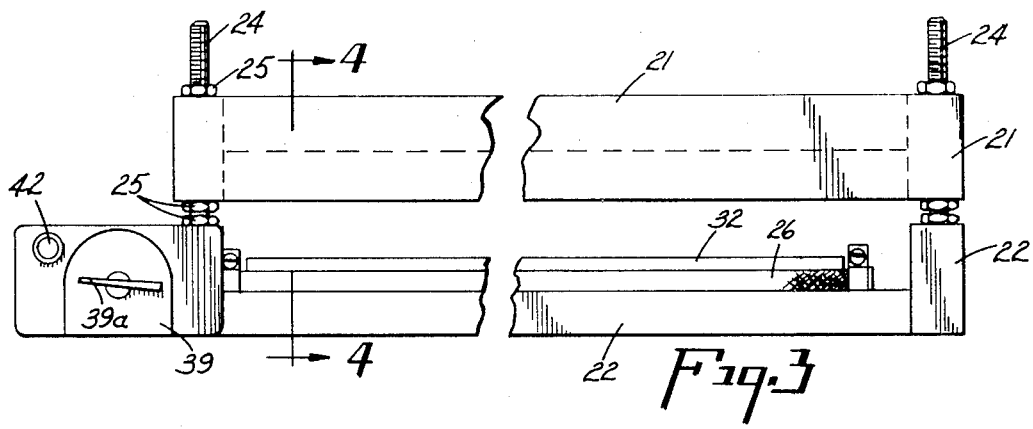
FIG. 3 is a front elevation of a typical press unit.

As shown in FIG. 2, the pressure members 26 are connected by the connections 31 to a manifold comprised of tees 32' and short connection pipes 33 with the tees in turn connected, each to the other, by means of connecting pipes 34.

The manifold just described, is in turn connected to a valve 35 mounted on the press unit, the valve 35 having a pilot valve 36 integral therewith, this valve combination being preferably a Hannifin C-10 air control valve of the normally closed configuration.

The valve 35 is supplied with air under pressure from the inlet 37 which is connected to the supply tube 9 of each press unit.

A supply line 37a extends from the inlet 37 to the other side of the press unit where it is connected to a pressure regulator 38 which reduces the incoming pressure from 120 PSI to about 30 PSI.

A short tube 38a connects regulator 38 to a time controlled valve 39 which, for the purposes hereof, is preferably an Erie NO. 242A3A series valve, which is settable for predetermined periods of time by the control handle 39a.

A pilot line 40 extends from the valve 39 back to the pilot valve 36, the line 40 also having a connection at 41 to a pneumatically controlled light 42.

Assuming that the air compressor 20 previously mentioned is supplying air at the 120 PSI pressure to the inlet 37 of the air control valve 35 and also to the supply line 37a, such air pressure will of course be regulated down to 30 PSI by the regulator 38. From the regulator 38, the air will pass through the line 38a to a time control valve 39.

If the time control valve 39 is actuated as by moving the handle 39a thereof for a predetermined period of time, air will pass therefrom into the line 40, back to the pilot valve 36.

At the same time, of course, the air will pass through the line 41 to the pneumatically controlled light 42, causing the same to be lighted.

Air passing back through the pilot line 40 will actuate the pilot valve 36 qnd thereby the air control valve 35 to admit air into the manifold previously described, and thence to the respective pressure members 26, inflating the same and moving the platen 32 upwardly accordingly.

Since the use of this mechanism, a mold with the appropriate mixture of materials therewithin to form the ultimate finished product, will have been introduced as by sliding the same along the platen in between the platen and the lower surface of the upper press plate 21. Thus, the air introduced to the flexible pressure members 26 will exert the desired pressure upon the mold to maintain the same in this condition until the molding operation time cycle is complete as controlled by the time control valve 39.

The press unit 1 which has been described just before in detail, may be positioned at a station designated A, and denoted as a loading station, during the operation of the press just previously described, and thereafter the drive motor 5 may be actuated to move the press unit at the station A to a position designated B, bringing a further press unit 1 into position at A.

It will be apparent, therefore, that successive press units may be in turn loaded with suitable mold and moved from position to position as suggested, on the conveyor 2 previously mentioned.

It may be assumed that the cycle of movement will be such that the press unit in moving from the station at A will involve a period of time of 4 minutes to reach the station C, which may be designated as an unloading station.

If the 4 minutes for which the molding cycle has been set by the time control valve 39 has elapsed, the air will be turned off by the valve 39 and the pneumatic light 42 will go out, indicating that the molding cycle is complete.

The release of the air pressure to the flexible pressure members 26 will permit the mold to be withdrawn from between the platen 32 and upper press plate 21, and thereafter the conveyor 2 may be moved again so as to bring the mold back into a position at station A for loading again.

It will be observed that where various cycles of molding time are required, the indication of the light 42 will determine that the mold may be removed from the press at whatever station it may be, and which may be thereby designated as an unloading station.

Thus, various different cycles of time may be accommodated by the construction wherein the air is constantly supplied from a central air column as 8, to the various press units in their position upon the endless conveyor 2, irrespective of the form or shape of the conveyor, and handling of the presses will not be required although they may be moved in various positions upon the conveyor if desired, so as to accommodate more or less press units as the case may be.

While generally speaking the specific means and general mechanism described have been contemplated as initially available for use in urethane or other similar plastic molding arrangements, at the same time this concept may be obviously availed of for molding of different materials availing of presses of the nature herein described, and arranged in a manner to move the same from loading to unloading positions and return by endless conveyor means.

It is further pointed out that the mechanism described may desirably be used to carry out other methods of molding, as for example one in which the movement of the platen 32 by the pressure members 26 will be one of positioning in contrast to exerting relatively greater pressure.

This type of action will be availed of where the compound which is used for forming the finished product in the mold, is one which expands as it cures or hardens or sets as the case may be. Thus when a mold is inserted in the press described, having a self-developing pressure composition therein, the mold parts are maintained in a predetermined position by the fluid pressure introduced through the manifold under control of the time controlled valve 39, set by the hand 39a for the time required.

At the end of the time required for setting or curing of the material in the mold, the light 42 will go out and the valve 35 automatically be actuated to terminate the holding pressure and the mold may then be withdrawn from between the upper and lower plates 21 and 22 respectively.

It is also noted that varying pressures may be supplied by adjustment of the pressure regulator, to other than 30 PSI.

I claim:

1. In molding mechanism of the class described, in combination, support means arranged to support one and a plurality of portable, removable and replaceable press units thereon, at least one press unit carried thereon for movement toward and from a loading station, fluid pressure distribution means for one and a plurality of said units, and connections from said means to the units to direct said pressure to the latter for operation thereof in the various positions of movement assumed thereby.

2. The combination as claimed in claim 1 wherein the support means comprise an endless conveyor, and the conveyor is constructed to move a series of press units described from a loading station to an unloading station.

3. The combination as claimed in claim 2, wherein the conveyor includes means to return the press units to the loading station.

4. The combination as claimed in claim 2, wherein the conveyor includes means to carry the press units back and forth between loading and unloading stations.

5. The combination as claimed in claim 1, wherein the fluid pressure distribution means includes a fluid pressure column, and the connections comprise lines leading to each of the press units.

6. The combination as claimed in claim 1, wherein the support means comprises an endless planar conveyor, operating means therefor, a series of press units is supported on the conveyor, the press units are carried around a central area, the fluid pressure distribution means includes instrumentalities in said area to direct fluid pressure to the said press units, and the loading and unloading stations are positioned about the periphery of the conveyor.

7. The combination as claimed in claim 6, wherein the press units include upper and lower press plates, a platen is positioned therebetween said lower press plate comprising a series of flexible pressure members operable to move the platen toward the upper plate, and means to simultaneously operate said members, said members being connected to the distribution means aforesaid.

8. The combination as claimed in claim 6, wherein the press units include upper and lower press plates and a platen intermediate the same, and means are provided to control the operation of the lower press plate for predetermined periods of time, to effect the pressure actuation of the platen and mold means intermediate said platen and the upper press plate.

* * * * *